(12) United States Patent
Caimano et al.

(10) Patent No.: US 10,583,535 B2
(45) Date of Patent: Mar. 10, 2020

(54) ADDITIVELY MANUFACTURED HEAT EXCHANGER

(71) Applicant: GE Avio S.r.l., Rivalta di Torino (IT)

(72) Inventors: Antonio Caimano, Turin (IT); Davide Losapio, Brindisi (IT); Stefano Antonio Fasanella, San Giovanni Rotondo (IT)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/992,779

(22) Filed: May 30, 2018

(65) Prior Publication Data

US 2018/0345425 A1 Dec. 6, 2018

(30) Foreign Application Priority Data

May 30, 2017 (EP) ..................................... 17425058

(51) Int. Cl.
  *F28D 1/00* (2006.01)
  *B23P 15/26* (2006.01)
  (Continued)

(52) U.S. Cl.
  CPC ............ *B23P 15/26* (2013.01); *B22F 3/1055* (2013.01); *B22F 5/106* (2013.01); *B29C 64/153* (2017.08);
  (Continued)

(58) Field of Classification Search
  CPC .... F28D 5/02; F28D 1/03325; F28D 1/05341; F28F 3/048; F28F 9/0204; F28F 9/0209;
  (Continued)

(56) References Cited

U.S. PATENT DOCUMENTS 5,540,278 A 7/1996 Chiba et al.
5,725,051 A 3/1998 Veltkamp
(Continued)

FOREIGN PATENT DOCUMENTS

EP 0622599 A2 11/1994
JP 2000/039288 A 2/2000
(Continued)

OTHER PUBLICATIONS

European Search Report Corresponding to EP Application 174250589 dated Mar. 14, 2018.

*Primary Examiner* — Davis D Hwu
(74) *Attorney, Agent, or Firm* — Dority & Manning, P.A.

(57) ABSTRACT

A heat exchanger and a method for additively manufacturing the heat exchanger are provided. The heat exchanger includes a housing defining a heat exchange plenum having a first fluid inlet and a first fluid outlet separated along a transverse direction. A plurality of heat exchange banks pass through the heat exchange plenum between a top side and a bottom side of the housing substantially along a vertical direction, each of the heat exchange banks comprising a plurality of heat exchange tubes. A plurality of collector manifolds are positioned at the top side and the bottom side of the housing, each collector manifold defining one or more connecting ports providing fluid communication between adjacent heat exchange banks.

20 Claims, 7 Drawing Sheets

(51) Int. Cl.
  *F28F 9/02* (2006.01)
  *F28D 1/053* (2006.01)
  *B29C 64/153* (2017.01)
  *B22F 3/105* (2006.01)
  *B22F 5/10* (2006.01)
  *B33Y 10/00* (2015.01)
  *B33Y 80/00* (2015.01)
  *B29L 31/18* (2006.01)

(52) U.S. Cl.
  CPC ..... *F28D 1/05325* (2013.01); *F28D 1/05341* (2013.01); *F28F 9/0209* (2013.01); *F28F 9/0212* (2013.01); *B29L 2031/18* (2013.01); *B33Y 10/00* (2014.12); *B33Y 80/00* (2014.12); *F28F 2255/18* (2013.01)

(58) Field of Classification Search
  CPC ...... F28F 2255/18; B33Y 10/00; B33Y 80/00; B29C 64/153; B29C 64/20; B23P 15/26
  USPC ........................................................ 165/148
  See application file for complete search history.

(56) References Cited

U.S. PATENT DOCUMENTS

| | | | |
|---|---|---|---|
| 7,013,964 B2 | 3/2006 | Pays et al. | |
| 7,810,552 B2 | 10/2010 | Slaughter | |
| 7,866,377 B2 | 1/2011 | Slaughter | |
| 8,517,086 B2 | 8/2013 | Mathew et al. | |
| 2006/0090888 A1 | 5/2006 | Huang et al. | |
| 2012/0012292 A1* | 1/2012 | Bugler, III | F28D 5/02 |
| | | | 165/174 |
| 2013/0299150 A1 | 11/2013 | Bellenfant et al. | |
| 2014/0284038 A1 | 9/2014 | Vedula et al. | |
| 2015/0137412 A1 | 5/2015 | Schalansky | |
| 2015/0345871 A1* | 12/2015 | Jeon | F28F 9/0204 |
| | | | 165/173 |
| 2016/0108813 A1 | 4/2016 | Schmitz | |
| 2016/0116218 A1 | 4/2016 | Shedd et al. | |
| 2018/0038651 A1* | 2/2018 | Tonellato | B60K 11/00 |
| 2018/0045471 A1 | 2/2018 | Dietrich | |
| 2018/0292146 A1* | 10/2018 | Furrer | F28F 3/048 |

FOREIGN PATENT DOCUMENTS

| | | |
|---|---|---|
| JP | 2006/132913 A | 5/2006 |
| JP | 2007/183076 A | 7/2007 |
| JP | 2011/002195 A | 1/2011 |
| JP | 2013/542392 A | 11/2013 |
| JP | 2016/145662 A | 8/2016 |
| JP | 2017/036868 | 2/2017 |
| KR | 101407144 B1 | 6/2014 |
| WO | WO2014/041771 A1 | 3/2014 |
| WO | WO2016/138997 | 9/2016 |

* cited by examiner

ADDITIVELY MANUFACTURED HEAT EXCHANGER

FIELD OF THE INVENTION

The present subject matter relates generally to heat exchangers, and more particularly, to additively manufactured heat exchangers with improved heat transfer capability and structural rigidity.

BACKGROUND OF THE INVENTION

Heat exchangers may be employed in conjunction with gas turbine engines for transferring heat between one or more fluids. For example, a first fluid at a relatively high temperature may be passed through a first passageway, while a second fluid at a relatively low temperature may be passed through a second passageway. The first and second passageways may be in thermal contact or close proximity, allowing heat from the first fluid to be passed to the second fluid. Thus, the temperature of the first fluid may be decreased and the temperature of the second fluid may be increased.

Conventional heat exchangers include a large number of fluid passageways, each fluid passageway being formed using some combination of plates, bar, foils, fins, manifolds, support structures, mounting flanges, etc. Each of these parts must be individually positioned, oriented, and connected to the supporting structure, e.g., via brazing, welding, or another joining method. The manufacturing time and costs associated with the assembly of such a heat exchanger are very high and the likelihood of fluid leaks between the fluid passageways or from the heat exchanger in general is increased due to the number of joints formed. In addition, manufacturing restrictions limit the number, size, and configuration of heat exchanger features and structural components that may be included in the heat exchanger, e.g., within the fluid passageways.

Accordingly, a gas turbine engine with an improved heat exchanger would be useful. More specifically, a heat exchanger for a gas turbine engine that is easier to manufacture and includes features for improved thermal and structural performance would be particularly beneficial.

BRIEF DESCRIPTION

Aspects and advantages of embodiments of the invention will be set forth in part in the following description, or may be obvious from the description, or may be learned through practice of embodiments of the invention.

In one exemplary embodiment of the present disclosure, a heat exchanger is provided. The heat exchanger defines a vertical direction, a lateral direction, and a transverse direction, the vertical, lateral, and transverse directions being mutually perpendicular to each other. The heat exchanger includes a housing defining a heat exchange plenum having a first fluid inlet and a first fluid outlet separated along the transverse direction and a plurality of heat exchange banks passing through the heat exchange plenum between a top side and a bottom side of the housing substantially along the vertical direction, each of the heat exchange banks including a plurality of heat exchange tubes. A plurality of collector manifolds are positioned at the top side and the bottom side of the housing, each collector manifold defining one or more connecting ports providing fluid communication between adjacent heat exchange banks.

In another exemplary aspect of the present disclosure, a method of manufacturing a heat exchanger is provided. The method includes depositing a layer of additive material on a bed of an additive manufacturing machine and selectively directing energy from an energy source onto the layer of additive material to fuse a portion of the additive material and form a heat exchanger. The heat exchanger defines a vertical direction, a lateral direction, and a transverse direction, the vertical, lateral, and transverse directions being mutually perpendicular to each other. The heat exchanger includes a housing defining a heat exchange plenum having a first fluid inlet and a first fluid outlet separated along the transverse direction and a plurality of heat exchange banks passing through the heat exchange plenum between a top side and a bottom side of the housing substantially along the vertical direction, each of the heat exchange banks including a plurality of heat exchange tubes. At least one collector manifold provides fluid communication between adjacent heat exchange banks.

In still another exemplary aspect of the present disclosure, a heat exchanger is provided. The heat exchanger includes a housing defining a heat exchange plenum extending substantially along a first direction and a plurality of heat exchange banks positioned within the heat exchanger plenum and extending between a first end and a second end substantially along a second direction, each of the heat exchange banks including a plurality of heat exchange tubes. A plurality of collector manifolds are positioned at the first end and the second end of the heat exchange banks, each collector manifold defining one or more connecting ports providing fluid communication between adjacent heat exchange banks, the connecting ports being at least partially defined by a plurality of stiffening ribs extending substantially along the second direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of embodiments of the invention.

BRIEF DESCRIPTION OF THE DRAWINGS

A full and enabling disclosure of embodiments of the present invention, including the best mode thereof, directed to one of ordinary skill in the art, is set forth in the specification, which makes reference to the appended figures.

Repeat use of reference characters in the present specification and drawings is intended to represent the same or analogous features or elements of embodiments of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of embodiments of the invention. As used herein, the terms "first", "second", and "third" may be used interchangeably to distinguish one component from another and are not intended to signify location or importance of the individual components. The terms "forward" and "aft" refer to relative positions within a gas turbine engine, with forward referring to a position closer to an engine inlet and aft referring to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows. Furthermore, as used herein, terms of approximation, such as "approximately," "substantially," or "about," refer to being within a ten percent margin of error.

As used herein, a "fluid" may be a gas or a liquid. The present approach is not limited by the types of fluids that are used. In the preferred application, the cooling fluid is air, and the cooled fluid is oil. The present approach may be used for other types of liquid and gaseous fluids, where the cooled fluid and the cooling fluid are the same fluids or different fluids. Other examples of the cooled fluid and the cooling fluid include fuel, hydraulic fluid, combustion gas, refrigerant, refrigerant mixtures, dielectric fluid for cooling avionics or other aircraft electronic systems, water, water-based compounds, water mixed with antifreeze additives (e.g., alcohol or glycol compounds), and any other organic or inorganic heat transfer fluid or fluid blends capable of persistent heat transport at elevated or reduced temperature.

The present disclosure is generally directed to a heat exchanger and a method for additively manufacturing the heat exchanger. The heat exchanger includes a housing defining a heat exchange plenum having a first fluid inlet and a first fluid outlet separated along a transverse direction. A plurality of heat exchange banks pass through the heat exchange plenum between a top side and a bottom side of the housing substantially along a vertical direction, each of the heat exchange banks comprising a plurality of heat exchange tubes. A plurality of collector manifolds are positioned at the top side and the bottom side of the housing, each collector manifold defining one or more connecting ports providing fluid communication between adjacent heat exchange banks.

Figure 1:
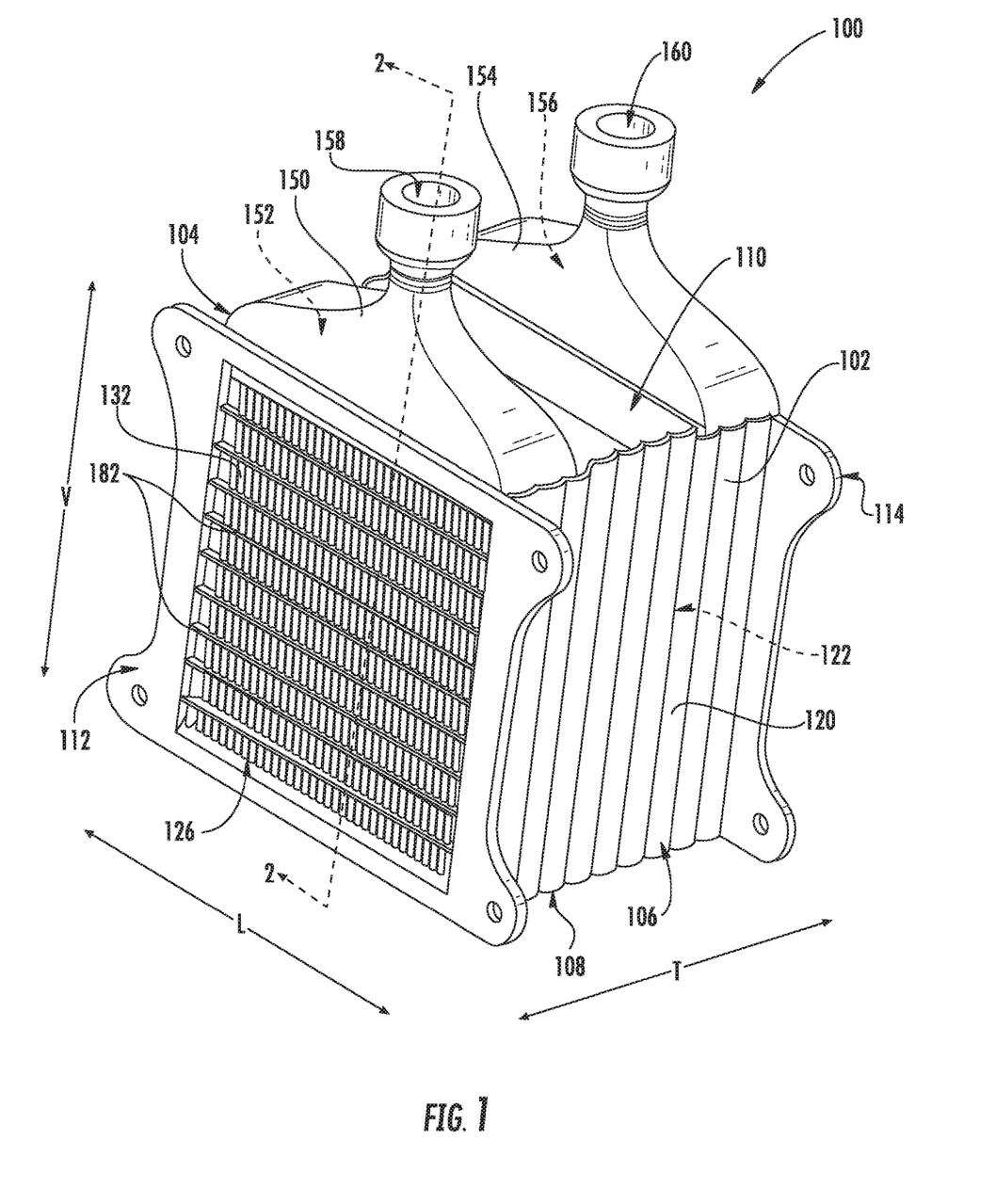
FIG. 1 provides a perspective view of an additively manufactured heat exchanger according to an exemplary embodiment of the present subject matter.

Referring to FIG. 1, an additively manufactured heat exchanger 100 will be described according to an exemplary embodiment of the present subject matter. Heat exchanger 100 may be used to transfer heat between two or more fluids in any suitable application. For example, as discussed below, heat exchanger 100 is configured for transferring heat from oil to air in a gas turbine engine. However, it should be appreciated that heat exchanger 100 can be configured for receiving any suitable number and type of fluids for use in the heat transfer process, examples which are described herein. In addition, the concepts and heat exchanging structures disclosed herein could be similarly used in automotive, aviation, maritime, and other industries to assist in heat transfer between fluids. Moreover, FIG. 1 illustrates an exemplary embodiment of heat exchanger 100 for the purpose of explaining its general operation, but the size, shape, and configuration of heat exchanger 100 is not intended to limit the scope of the present subject matter. For example, the size, shape, number, and configuration of fluid passageways may be varied while remaining within the scope of the present subject matter.

In general, the exemplary embodiments of heat exchanger 100 described herein may be manufactured or formed using any suitable process. However, in accordance with several aspects of the present subject matter, heat exchanger 100 may be formed using an additive-manufacturing process, such as a 3-D printing process. The use of such a process may allow heat exchanger 100 to be formed integrally, as a single monolithic component, or as any suitable number of sub-components. In particular, the manufacturing process may allow heat exchanger 100 to be integrally formed and include a variety of features not possible when using prior manufacturing methods. For example, the additive manufacturing methods described herein enable the manufacture of heat exchangers having various features, configurations, thicknesses, materials, densities, fluid passageways, and mounting structures not possible using prior manufacturing methods. Some of these novel features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets and laserjets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The plurality of successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 μm and 200 μm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 μm, utilized during the additive formation process.

In addition, utilizing an additive process, the surface finish and features of the components may vary as need depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing restraints. However, the present inventors have utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may improve the overall assembly process. For example, the integral formation reduces the number of separate parts that must be assembled, thus reducing associated time and overall assembly costs. Additionally, existing issues with, for example, leakage, joint quality between separate parts, and overall performance may be reduced.

Also, the additive manufacturing methods described above enable much more complex and intricate shapes and contours of the components described herein. For example, such components may include thin additively manufactured layers and unique fluid passageways with integral collector manifolds. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved heat transfer efficiency and reliability.

Figure 2:
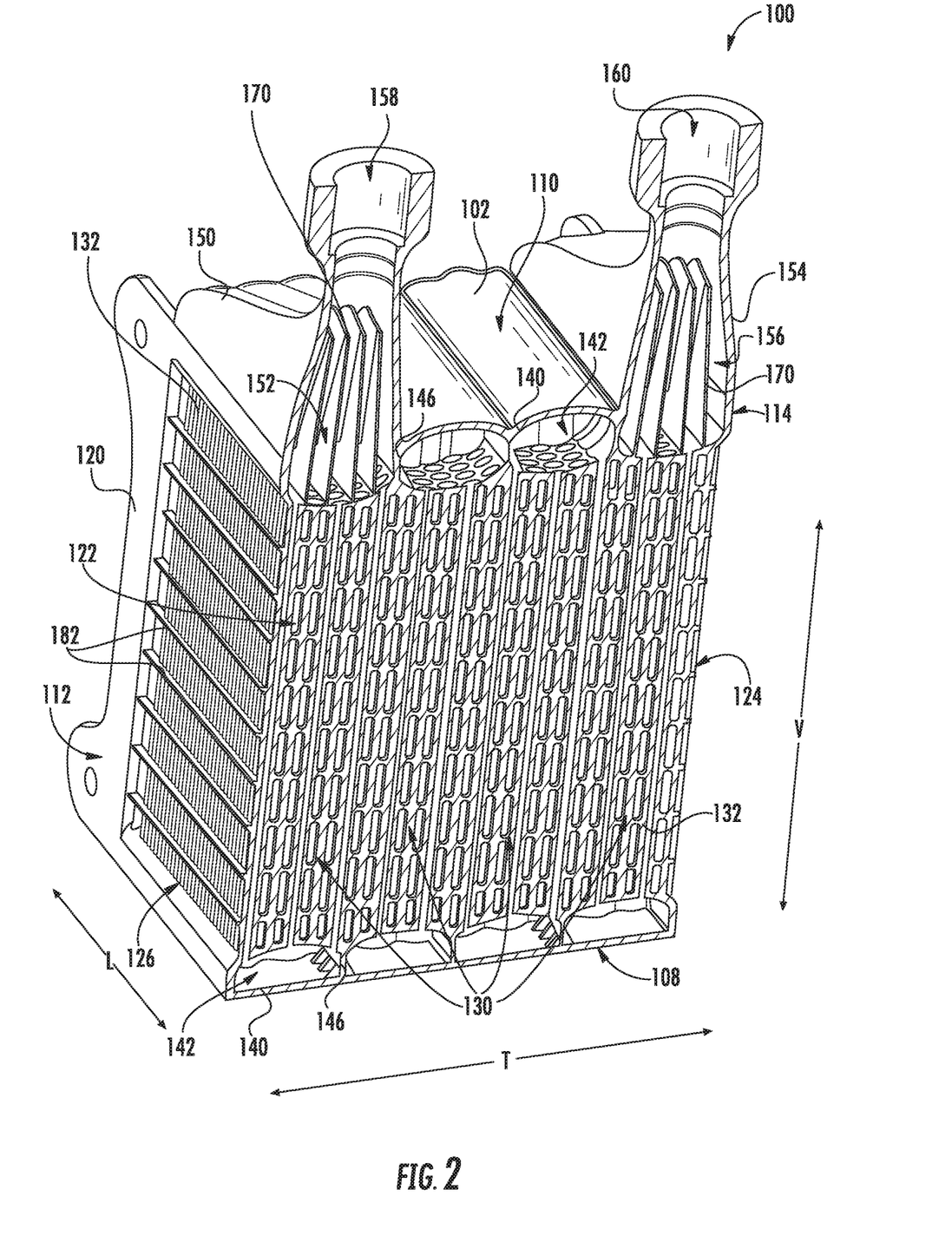
FIG. 2 provides a cross-sectional view of the exemplary heat exchanger of FIG. 1, taken along Line 2-2 of FIG. 1.
Figure 3:
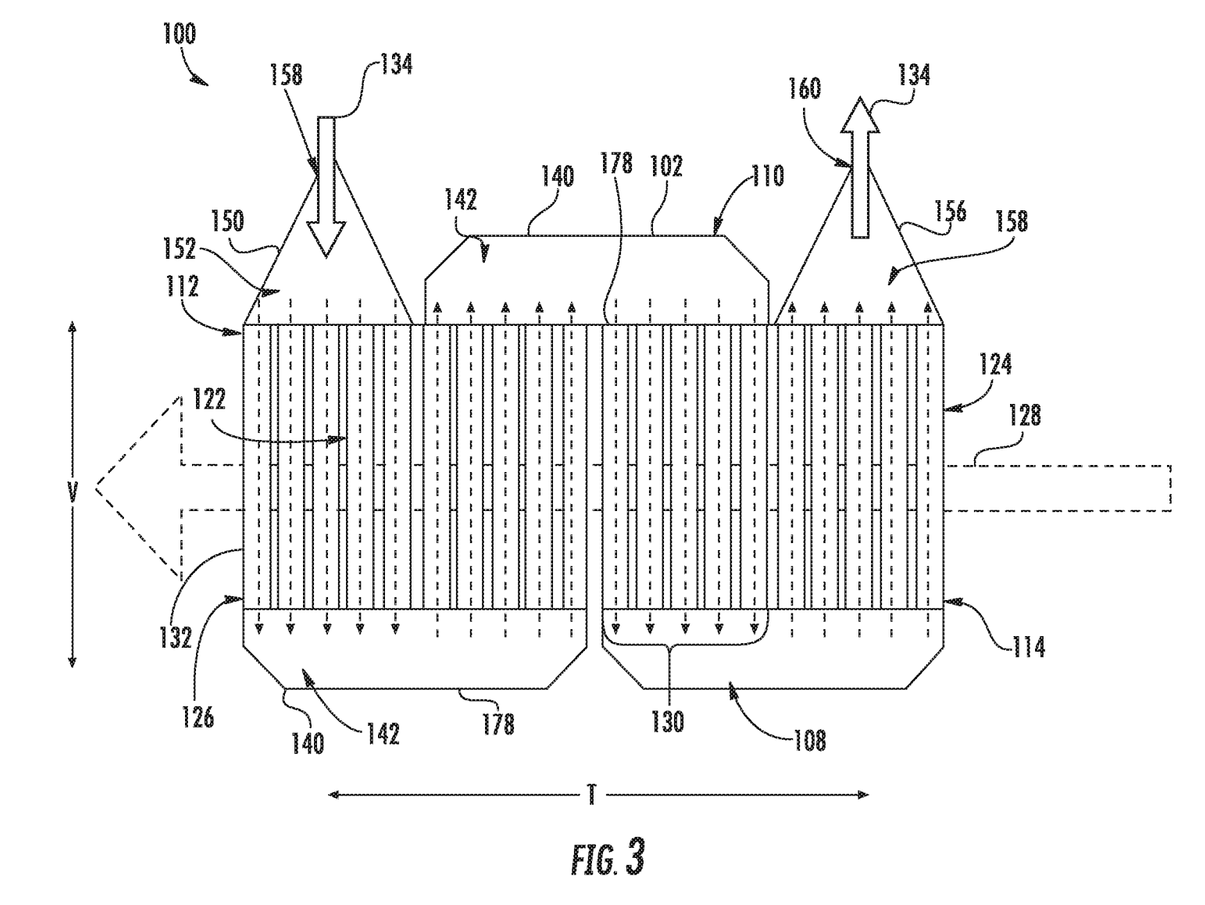
FIG. 3 provides a schematic cross-sectional view of the exemplary heat exchanger of FIG. 1, illustrating fluid flow directions according to an exemplary embodiment of the present subject matter.

Referring now generally to FIGS. 1 through 3, heat exchanger 100 will be described according to an exemplary embodiment of the present subject matter. As illustrated, heat exchanger 100 includes a housing 102 that extends between a left side 104 and a right side 106 along a first direction, e.g., the lateral direction L. In addition, housing 102 also extends between a bottom side 108 and a top side 110 along a second direction, e.g., the vertical direction V. Housing 102 extends between a front side 112 and a back side 114 along a third direction, e.g., the transverse direction T. According to the illustrated embodiment, the lateral direction L, the vertical direction V, and the transverse direction T are mutually perpendicular with one another, such that an orthogonal coordinate system is generally defined.

However, it should be appreciated that the exemplary heat exchanger 100 and the L-V-T coordinate system are used herein only for the purpose of explaining aspects of the present subject matter and are not intended to limit the scope of the present disclosure. In this regard, directional indicators such as "left" and "right," "top" and "bottom," and "front" and "back" are only used to indicate the relative positioning of various parts of heat exchanger 100 along the L-direction, the V-direction, and the T-direction, respectively. Moreover, the various parts and features of exemplary heat exchanger 100 may have a different position, orientation, and configuration while remaining within the scope of the present subject matter.

As illustrated, housing 102 generally comprises a plurality of walls 120 defining a heat exchange plenum 122. More specifically, walls 120 generally form a box having a rectangular cross-section defining heat exchange plenum 122. However, it should be appreciated that walls 120 may include fewer or more than four walls joined in any suitable orientation to define a suitably shaped heat exchange plenum 122. Housing 102 further defines a first fluid inlet, referred to herein as an air inlet 124, and a first fluid outlet, referred to herein as an air outlet 126, separated along a first direction, e.g., the transverse direction T.

Therefore, as best illustrated schematically in FIG. 3 air inlet 124 and air outlet 126 are in fluid communication with heat exchange plenum 122 for allowing a flow of cooling air (indicated by arrow 128 in FIG. 3) to pass through heat exchange plenum 122. According to the illustrated embodiment, air inlet 124 is defined at back side 114 of housing 102 and air outlet 126 is defined at front side 112 of housing 102. However, other flow directions may be used according to alternative embodiments. In addition, although the present disclosure describes heat exchanger 100 being configured for passing air through heat exchange plenum 122, it should be appreciated that any suitable heat exchange fluid may be used according to alternative embodiments.

Heat exchanger 100 further includes a plurality of heat exchange banks 130 positioned within and passing through heat exchange plenum 122 between top side 110 and bottom side 108 of housing 102 substantially along a second direction, e.g., the vertical direction V. Each heat exchange bank 130 includes a plurality of heat exchange tubes 132. As best illustrated schematically in FIG. 3, heat exchange banks 130 are generally configured to receive a flow of hot oil (indicated by arrow 134 in FIG. 3) which passes through heat exchange tubes 132 substantially along the vertical direction V between a first end of heat exchange bank 130 proximate top side 110 of housing 102 and a second end of heat exchange bank 130 proximate bottom side 108 of housing 102.

Heat exchanger 100 further includes a plurality of collector manifolds 140 positioned at top side 110 and bottom side 108 of housing 102. Collector manifolds 140 define collector plenums 142 that provide fluid communication between adjacent heat exchange banks 130 and a continuous fluid passageway for the flow of hot oil 134 to pass through heat exchanger 100. As illustrated, each collector manifold 140 defines one or more connecting ports 144 that provide fluid communication between adjacent heat exchange banks 130. In this regard, connecting ports 144 are apertures defined in divider walls 146 that divide adjacent heat exchange banks 130. More specifically, collector manifolds 140 define connecting ports 144 on alternating divider walls 146, such that a serpentine flow path is generally defined.

Notably, heat exchange banks 130 and heat exchange tubes 132 are illustrated as passing up and down along the vertical direction V. By passing hot oil 134 through collector plenums 142 and connecting ports 144 as described above, the flow of hot oil 134 also passes in a serpentine pattern along the transverse direction T. In this manner, hot oil 134 from each heat exchange tube 132 within a heat exchange bank 130 will flow into the respective collector plenum 142 where the oil will mix together before passing through connecting ports 144 into the adjacent heat exchange bank 130. Such a configuration ensures even temperature distribution within a flow of hot oil 134 and improves heat transfer efficiency.

Although heat exchange tubes 132 are illustrated as being straight tubes routed in a serpentine manner, it should be appreciated that according to alternative embodiments, each heat exchange tube 132 may be curvilinear, serpentine, helical, sinusoidal, or any other suitable shape. In addition, heat exchange tubes 132 may be formed in any suitable size, number, spacing, shape, orientation, and number of passes as needed depending on the application and the type of heat exchange fluid. These various configurations are enabled by the additive manufacturing processes disclosed herein and are considered to be within the scope of the present subject matter.

In addition, heat exchanger 100 is illustrated as having four heat exchange banks 130 and each heat exchange bank 130 as having five rows of heat exchange tubes 132. However, it should be appreciated that according to alternative embodiments, fewer or more than four heat exchange banks 130 and fewer or more than five heat exchange tubes 132 may be used. In addition, heat exchange banks 130 and heat exchange tubes 132 may have any suitable size and/or configuration as needed for a given application.

Referring specifically to FIGS. 1 through 4, heat exchanger 100 further includes an inlet manifold 150 positioned proximate front side 112 and top side 110 of housing 102 and defining an inlet plenum 152. In addition, heat exchanger 100 further includes an outlet manifold 154 positioned proximate back side 114 and top side 110 of housing 102 and defining an outlet plenum 156. Inlet plenum 152 and outlet plenum 156 are in direct fluid communication with a first heat exchange bank 130 and a last heat exchange bank 130, respectively. Therefore, during operation of heat exchanger 100, the flow of oil 134 passes through a second fluid inlet, referred to herein as an oil inlet 158 and into inlet plenum 152. The flow of oil 134 then passes through heat exchange banks 130 and collector plenums 142 in a serpentine manner as described above. Finally, the flow of oil 134 exits heat exchanger 100 through outlet plenum 156 and a second fluid outlet, referred to herein as an oil outlet 160. In this manner, a continuous passageway for hot oil 134 is defined through heat exchange plenum 122 such that thermal energy may be transferred from the flow of hot oil 134 to the flow of cooling air 128 passing through heat exchange plenum 122.

Heat exchanger 100 is described herein as passing cooling air 128 through heat exchange plenum 122 generally along the first direction, i.e., the transverse direction T, and passing hot oil 134 through heat exchange tubes 132 generally along the second direction, i.e., the vertical direction V, such that the flows are perpendicular to each other and in a cross-flow heat exchange arrangement. However, it should be appreciated that the directional orientation of heat exchange tubes 132 relative to housing 102 and heat exchange plenum 122 may vary while remaining within the scope of the present subject matter. In this regard, according to alternative embodiments, heat exchange tubes 132 may be configured in another cross-flow orientation with heat exchange plenum 122, in a parallel flow arrangement, or in any other suitable orientation. In addition, as described in detail above, any suitable alternative heat exchange fluids may be used.

Using the additive manufacturing techniques described herein, heat exchanger 100 may further include a variety of features that improve operation of heat exchanger 100. Some exemplary features are described below which may improve the structural rigidity of heat exchanger 100, may improve fluid flow through heat exchanger 100, may improve heat transfer efficiency of heat exchanger 100, or may otherwise improve the operation of heat exchanger 100.

Figure 4:
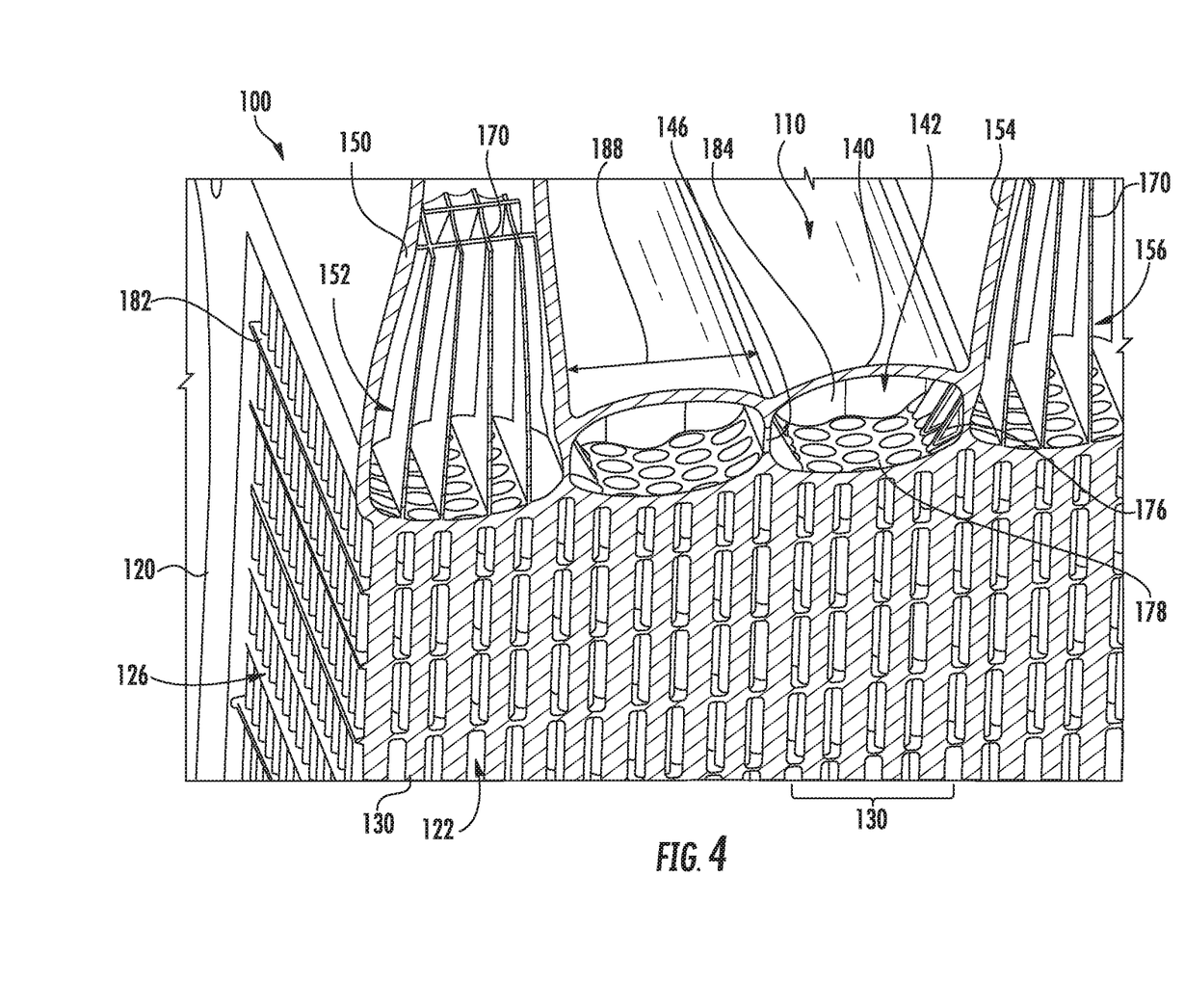
FIG. 4 provides a close-up, cross-sectional view of a collector manifold of the exemplary heat exchanger of FIG. 1 according to an exemplary embodiment of the present subject matter.
Figure 5:
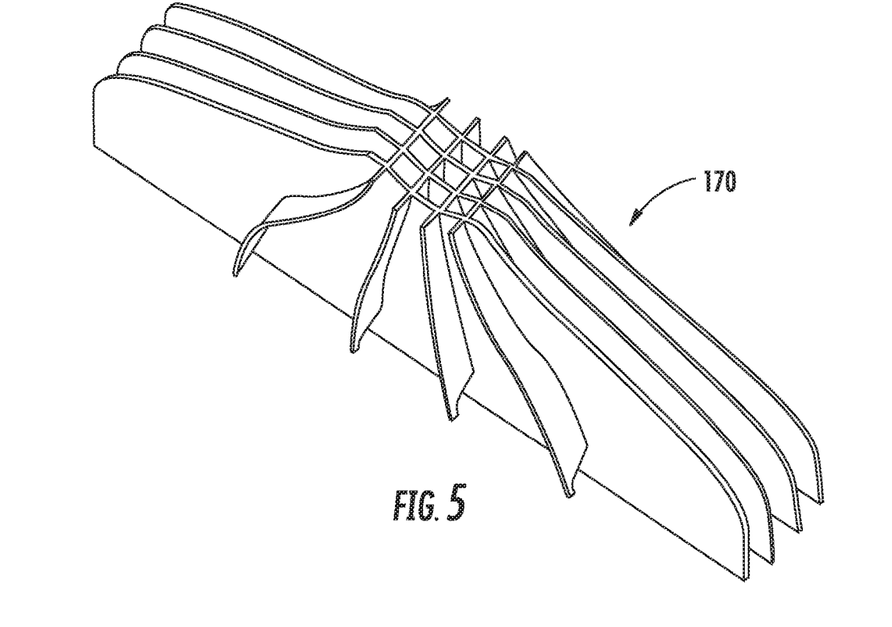
FIG. 5 provides a perspective view of a flow splitter the may be used in the exemplary heat exchanger of FIG. 1 according to an exemplary embodiment of the present subject matter.

For example, referring to FIGS. 2, 4, and 5, heat exchanger 100 may include one or more flow splitters 170 positioned within inlet plenum 152. Flow splitters 170 within inlet manifold 150 generally extend between a location proximate oil inlet 158 to a location proximate to the first heat exchange bank 130 or the inlets of heat exchange tubes 132. Similarly, flow splitters 170 are positioned within outlet plenum 156 and generally extend between a location proximate the last heat exchange bank 130 or the outlets of heat exchange tubes 132 to a location proximate oil outlet 160.

Flow splitters 170 are generally shaped to assist in splitting or merging the flow of oil 134 in a uniform manner while reducing flow losses and pressure drops. According to the illustrated embodiment, at least one flow splitter 170 extends within a first plane perpendicular to the transverse direction T and at least one flow splitter 170 extends along the transverse direction T. However, flow splitters 170 may have any suitable shape for directing the flow of oil 134 to achieve an even flow distribution among the heat exchange tubes 132 within the first heat exchange bank 130 and for efficiently merging the flow of oil 134 from the last heat exchange bank 130 within outlet plenum 156.

Figure 6:
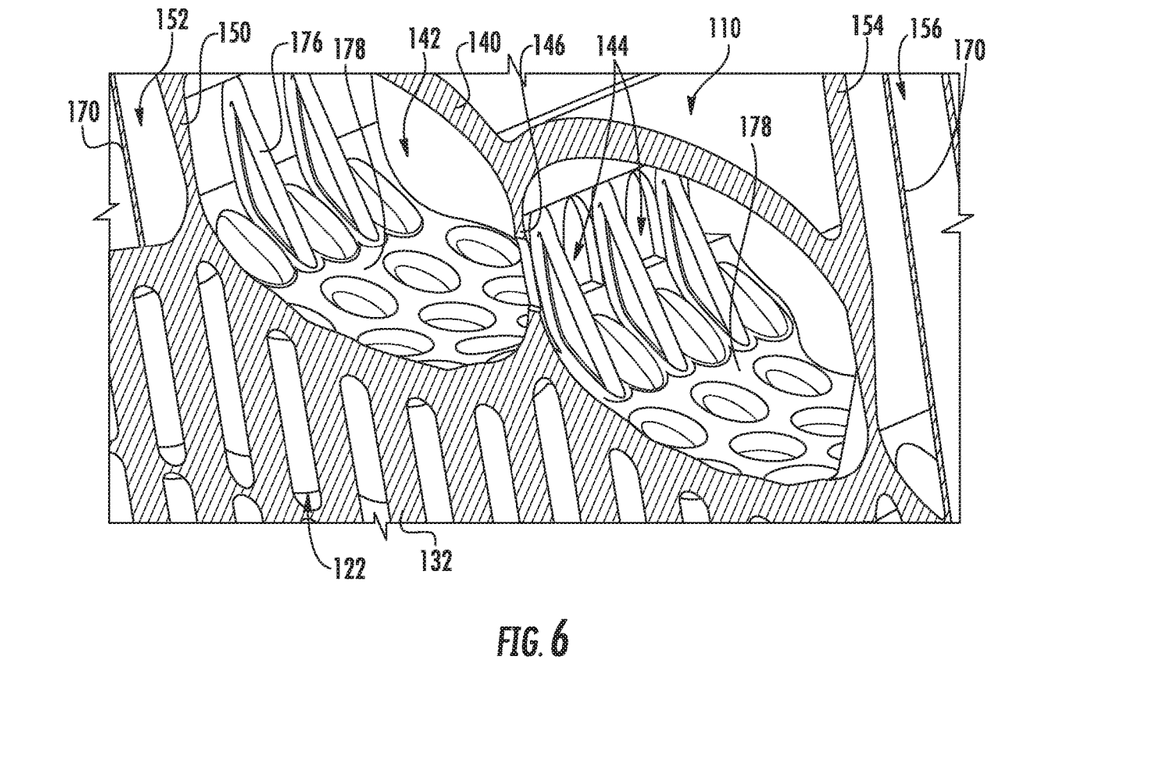
FIG. 6 provides a perspective, cross-sectional view of the exemplary collector manifold of FIG. 4 according to an exemplary embodiment of the present subject matter.

As best illustrated in FIGS. 2 and 6, heat exchanger 100 further includes a plurality of stiffening ribs 176 defined by collector manifolds 140 and positioned within collector plenums 142. Stiffening ribs 176 extend substantially along the vertical direction V between adjacent heat exchange banks 130 and at least partially defining the connecting ports 144. Stiffening ribs 176 may generally be shaped to increase the structural rigidity of collector manifold 130 and decrease the stagnation of fluid flow within collector plenum 142. For example, as illustrated, stiffening ribs 176 are substantially triangular stiffening ribs 176, with a base of the triangle being positioned at a bottom wall 178 of collector manifold 140 along the vertical direction V and extending toward and supporting divider wall 146. Other shapes, configurations, and orientations are possible according to alternative embodiments.

Figure 7:
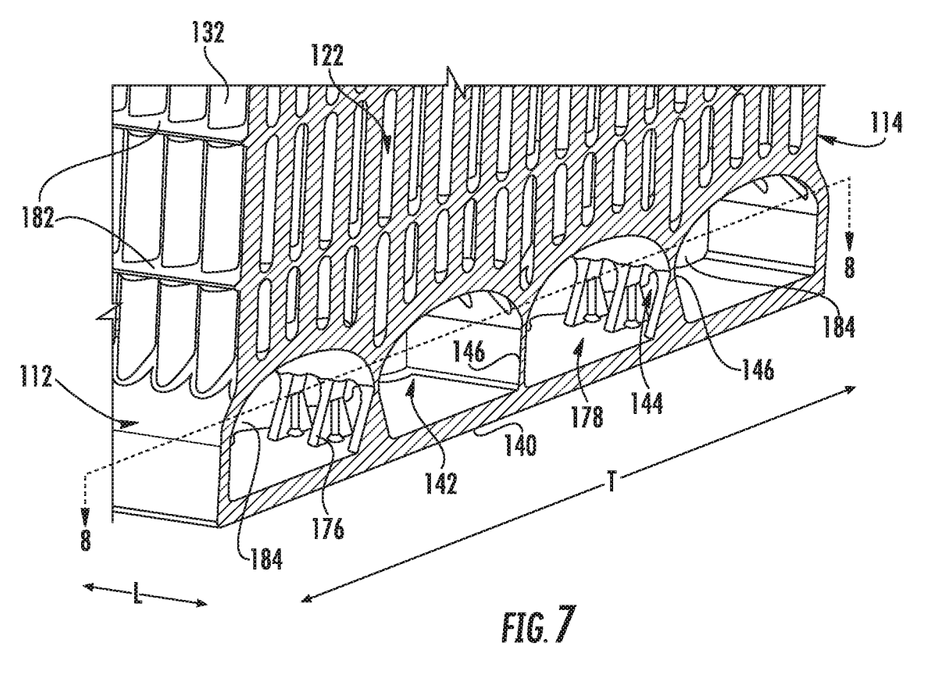
FIG. 7 provides another cross-sectional view of the exemplary heat exchanger of FIG. 1.

As best illustrated in FIGS. 1, 2, and 7, heat exchanger 100 further includes a plurality of stiffening plates 182 that extend along a plane substantially perpendicular to the vertical direction V and rigidly couple the plurality of heat exchange tubes 132. As illustrated, heat exchanger 100 includes nine horizontally oriented stiffening plates that provide structural rigidity and an improved frequency response of heat exchanger 100. Stiffening plates 182 also act to divide the flow of cooling air 128 along the vertical direction V to provide a more uniform flow distribution. However, according to alternative embodiments, any suitable number, position, orientation, and configuration of stiffening plates 182 may be used.

Figure 8:
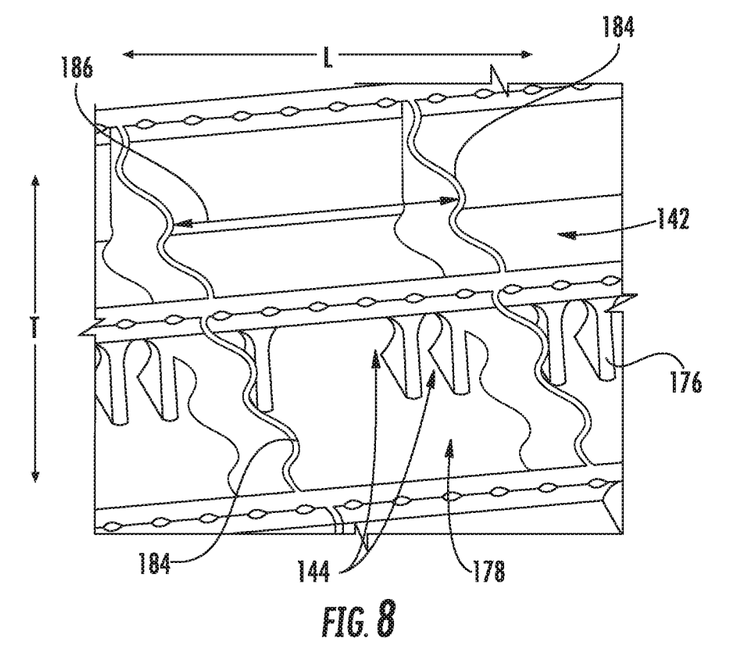
FIG. 8 provides a cross-sectional view of the exemplary heat exchanger of FIG. 1, taken along Line 8-8 of FIG. 7.

Referring now to FIGS. 7 and 8, heat exchanger 100 further includes a plurality of wave stiffeners 184 positioned within collector plenums 142 and extending substantially along the vertical direction V to divide the flow of hot oil 134 along the lateral direction L. According to the illustrated embodiment, wave stiffeners 184 have a sinusoidal shape and define a width 186 (FIG. 8) measured between wave stiffeners 184 along the lateral direction L that is approximately equivalent to a width 188 (FIG. 4) of a single heat exchange bank 130 taken along the transverse direction T. However, according to alternative embodiments, any suitable number, size, position, orientation, and configuration of wave stiffeners 184 may be used.

The various portions of heat exchanger 100 may be constructed using any suitable material, in any suitable geometry, density, and thickness, as needed to provide necessary structural support to heat exchanger 100. For example, housing 102 of heat exchanger 100 may be formed from a rigid, thermally insulating material. In addition, housing 102 may be thicker and denser to provide structural support for loads experienced by heat exchanger 100 during mounting, assembly, and operation. By contrast, heat exchange tubes 132 may be thinner and constructed of a more thermally conductive material in order to enhance heat transfer. For example, heat exchange tubes 132 may have a wall thickness of 20 μm or any other suitable thickness.

It should be appreciated that heat exchanger 100 is described herein only for the purpose of explaining aspects of the present subject matter. For example, heat exchanger 100 will be used herein to describe exemplary configurations, constructions, and methods of manufacturing heat exchanger 100. It should be appreciated that the additive manufacturing techniques discussed herein may be used to manufacture other heat exchangers for use in any suitable device, for any suitable purpose, and in any suitable industry. Thus, the exemplary components and methods described herein are used only to illustrate exemplary aspects of the present subject matter and are not intended to limit the scope of the present disclosure in any manner.

Now that the construction and configuration of heat exchanger 100 according to an exemplary embodiment of the present subject matter has been presented, an exemplary method 200 for forming a heat exchanger according to an exemplary embodiment of the present subject matter is provided. Method 200 can be used by a manufacturer to form heat exchanger 100, or any other suitable heat exchanger. It should be appreciated that the exemplary method 200 is discussed herein only to describe exemplary aspects of the present subject matter, and is not intended to be limiting.

Figure 9:
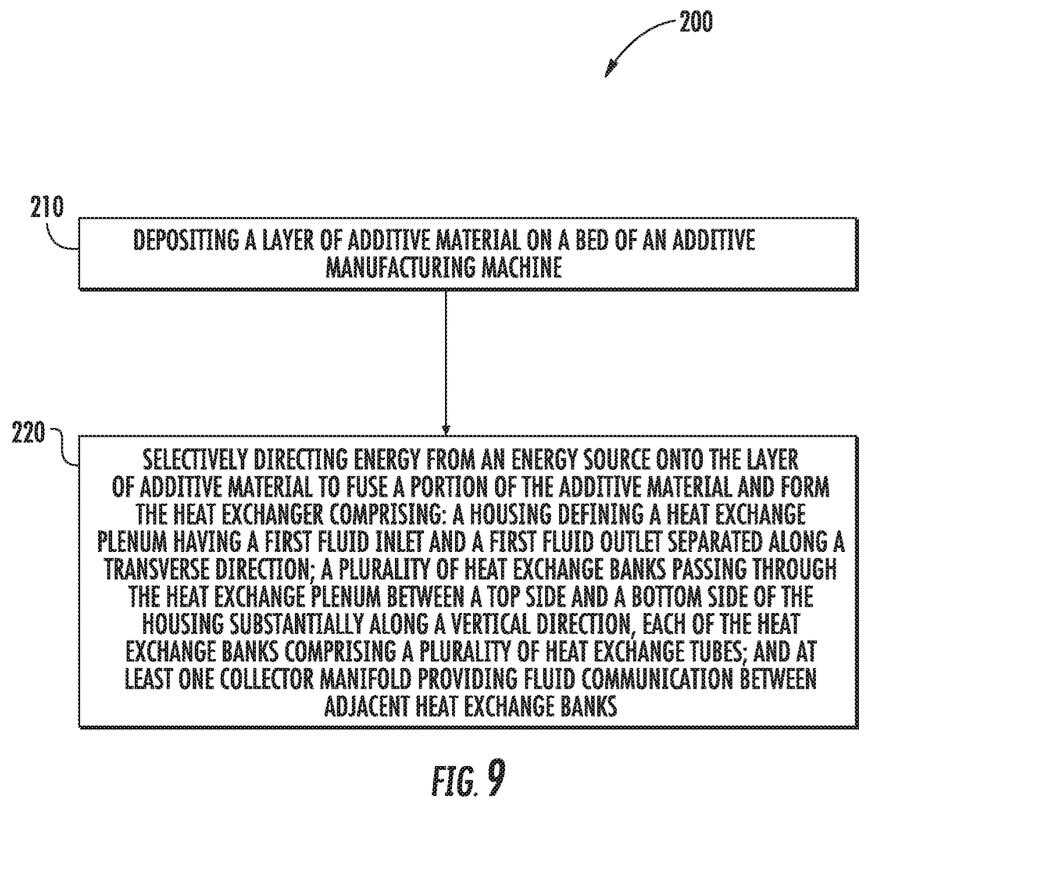
FIG. 9 is a method of manufacturing a heat exchanger according to an exemplary embodiment of the present subject matter.

Referring now to FIG. 9, method 200 includes, at step 210, depositing a layer of additive material on a bed of an additive manufacturing machine. Method 200 further includes, at step 220, selectively directing energy from an energy source onto the layer of additive material to fuse a portion of the additive material and form a heat exchanger. For example, using the example from above, heat exchanger 100 may be formed for transferring heat between air and oil, or any other suitable heat exchanger may be formed.

The heat exchanger formed at step 220 may include a housing defining a heat exchange plenum having a first fluid inlet and a first fluid outlet separated along a transverse direction. A plurality of heat exchange banks pass through the heat exchange plenum between a top side and a bottom side of the housing substantially along a vertical direction, each of the heat exchange banks including a plurality of heat exchange tubes. A plurality of collector manifolds are positioned at the top side and the bottom side of the housing, each collector manifold defining one or more connecting ports providing fluid communication between adjacent heat exchange banks.

According to exemplary embodiments, method 200 may further include using the additive manufacturing methods described herein to form an integral inlet manifold and outlet manifold. Inlet manifold is positioned proximate the front side of the housing and defines an inlet plenum in direct fluid communication with a first heat exchange bank. One or more flow splitters are positioned within the inlet plenum and extend between a second fluid inlet and the first heat exchange bank. Outlet manifold is positioned proximate the back side of the housing and defines an outlet plenum in direct fluid communication with a last heat exchange bank. Similarly, one or more flow splitters are positioned within the outlet plenum and extend between the last heat exchange bank and a second fluid outlet. Notably, according to an exemplary embodiment, the housing, the heat exchange banks, the collector manifolds, the inlet manifold, the outlet manifold, and other parts of the heat exchanger such as described above are integrally formed as a single monolithic component.

FIG. 9 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 200 are explained using heat exchanger 100 as an example, it should be appreciated that these methods may be applied to manufacture any suitable heat exchanger.

An additively manufactured heat exchanger and a method for manufacturing that heat exchanger are described above. Notably, heat exchanger 100 may generally include performance-enhancing geometries and heat exchanging features whose practical implementations are facilitated by an additive manufacturing process, as described below. For example, using the additive manufacturing methods described herein, the heat exchanger may include a heat exchange structure for transferring thermal energy between two streams of fluid. In addition, the additively manufacturing techniques described herein enable the formation of a heat exchanger with integral collector manifolds which improve the thermal efficiency of the heat exchanger. These features may be introduced during the design of the heat exchanger, such that they may be easily integrated into heat exchanger during the build process at little or no additional cost. Moreover, the entire heat exchanger, including the housing, the heat exchange banks, the collector manifolds, the inlet manifold, the outlet manifold, the flow splitters, and other features can be formed integrally as a single monolithic component.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heat exchanger defining a vertical direction, a lateral direction, and a transverse direction, the vertical, lateral, and transverse directions being mutually perpendicular to each other, the heat exchanger comprising:
   - a housing defining a heat exchange plenum having a first fluid inlet and a first fluid outlet separated along the transverse direction;
   - a plurality of heat exchange banks passing through the heat exchange plenum between a top side and a bottom side of the housing substantially along the vertical direction, each of the heat exchange banks comprising a plurality of heat exchange tubes;
   - a plurality of collector manifolds positioned at the top side and the bottom side of the housing, each collector manifold defining one or more connecting ports providing fluid communication between adjacent heat exchange banks;
   - an inlet manifold defining an inlet plenum in direct fluid communication with a first heat exchange bank; and
   - an outlet manifold defining an outlet plenum in direct fluid communication with a last heat exchange bank.

2. The heat exchanger of claim 1, further comprising:
   - at least one inlet manifold or outlet manifold in fluid communication with an intermediate heat bank positioned between the first heat exchange bank and the last heat exchange bank along the transverse direction.

3. The heat exchanger of claim 1, wherein the heat exchanger comprises:
   - one or more flow splitters positioned within the inlet plenum and extending between a second fluid inlet and the first heat exchange bank; and
   - one or more flow splitters positioned within the outlet plenum and extending between the last heat exchange bank and a second fluid outlet.

4. The heat exchanger of claim 3, wherein at least one of the flow splitters extends within a first plane perpendicular to the transverse direction and at least one of the flow splitters extends along the transverse direction.

5. The heat exchanger of claim 1, wherein the housing defines a front side and a back side separated along the transverse direction, and wherein the first fluid inlet is defined at the back side of the housing and the first fluid outlet is defined at the front side of the housing.

6. The heat exchanger of claim 1, wherein the housing, the heat exchange tubes, the inlet manifold, the outlet manifold, and the collector manifolds are integrally formed as a single monolithic component.

7. The heat exchanger of claim 1, further comprising:
a plurality of stiffening plates that extend along a plane substantially perpendicular to the vertical direction and rigidly couple the plurality of heat exchange tubes.

8. The heat exchanger of claim 1, further comprising:
a plurality of wave stiffeners positioned within the collector manifolds and extending substantially along the vertical direction.

9. The heat exchanger of claim 8, wherein the plurality of wave stiffeners have a sinusoidal shape and divide a flow of fluid within the collector manifolds along the lateral direction.

10. The heat exchanger of claim 1, further comprising:
a plurality of stiffening ribs positioned within the collector manifold, the stiffening ribs extending substantially along the vertical direction between adjacent heat exchange banks and at least partially defining the connecting ports.

11. The heat exchanger of claim 10, wherein the stiffening ribs are substantially triangular stiffening ribs, with a base of the triangular stiffening ribs being positioned at a bottom of the collector manifold along the vertical direction.

12. The heat exchanger of claim 1, wherein the heat exchanger comprises a plurality of layers formed by:
depositing a layer of additive material on a bed of an additive manufacturing machine; and
selectively directing energy from an energy source onto the layer of additive material to fuse a portion of the additive material.

13. A method of manufacturing a heat exchanger, the method comprising:
depositing a layer of additive material on a bed of an additive manufacturing machine; and
selectively directing energy from an energy source onto the layer of additive material to fuse a portion of the additive material and form a heat exchanger defining a vertical direction, a lateral direction, and a transverse direction, the vertical, lateral, and transverse directions being mutually perpendicular to each other, the heat exchanger comprising:
a housing defining a heat exchange plenum having a first fluid inlet and a first fluid outlet separated along the transverse direction;
a plurality of heat exchange banks passing through the heat exchange plenum between a top side and a bottom side of the housing substantially along the vertical direction, each of the heat exchange banks comprising a plurality of heat exchange tubes;
at least one collector manifold providing fluid communication between adjacent heat exchange banks;
an inlet manifold defining an inlet plenum in direct fluid communication with a first heat exchange bank; and
an outlet manifold defining an outlet plenum in direct fluid communication with a last heat exchange bank.

14. The method of claim 13, wherein the heat exchanger comprises:
a plurality of collector manifolds positioned at the top side and the bottom side of the housing, each of the collector manifolds defining one or more connecting ports providing fluid communication between adjacent heat exchange banks.

15. The method of claim 13, the method further comprising:
forming one or more flow splitters positioned within the inlet plenum and extending between a second fluid inlet and the first heat exchange bank; and
forming one or more flow splitters positioned within the outlet plenum and extending between the last heat exchange bank and a second fluid outlet.

16. The method of claim 13, further comprising:
forming a plurality of wave stiffeners positioned within the at least one collector manifold and extending substantially along the vertical direction and having a sinusoidal shape that divides a flow of fluid within the at least one collector manifold along the lateral direction.

17. The method of claim 14, further comprising:
forming a plurality of stiffening ribs positioned within the collector manifolds, the stiffening ribs extending substantially along the vertical direction between adjacent heat exchange banks and at least partially defining the connecting ports.

18. A heat exchanger comprising:
a housing defining a heat exchange plenum extending substantially along a first direction;
a plurality of heat exchange banks positioned within the heat exchanger plenum and extending between a first end and a second end substantially along a second direction, each of the heat exchange banks comprising a plurality of heat exchange tubes; and
a plurality of collector manifolds positioned at the first end and the second end of the heat exchange banks, each collector manifold defining one or more connecting ports providing fluid communication between adjacent heat exchange banks, the connecting ports being at least partially defined by a plurality of stiffening ribs extending substantially along the second direction.

19. The heat exchanger of claim 18, further comprising:
an inlet manifold defining an inlet plenum in direct fluid communication with a first heat exchange bank; and
an outlet manifold defining an outlet plenum in direct fluid communication with a last heat exchange bank.

20. The heat exchanger of claim 18, further comprising:
a plurality of stiffening plates that extend along a plane substantially perpendicular to the second direction and rigidly couple the plurality of heat exchange tubes.

* * * * *

UNITED STATES PATENT AND TRADEMARK OFFICE
CERTIFICATE OF CORRECTION

| | | |
|---|---|---|
| PATENT NO. | : 10,583,535 B2 | Page 1 of 1 |
| APPLICATION NO. | : 15/992779 | |
| DATED | : March 10, 2020 | |
| INVENTOR(S) | : Davide Losapio, Stefano Antonio Fasanella and Antonio Caimano | |

It is certified that error appears in the above-identified patent and that said Letters Patent is hereby corrected as shown below:

On the Title Page

Item (73), please delete "General Electric Company, Schenectady, New York" and please insert
--GE Avio, S.r.l., Rivalta di Torino, Italy--.

Signed and Sealed this
Eighteenth Day of August, 2020

Andrei Iancu
*Director of the United States Patent and Trademark Office*